Oct. 2, 1923.

J. W. DIRKSON ET AL

STITCHER WHEEL AND GUARD

Filed Oct. 15, 1920

1,469,753

INVENTORS
John W. Dirkson
Lee E. Clough

Patented Oct. 2, 1923.

1,469,753

UNITED STATES PATENT OFFICE.

JOHN W. DIRKSON, OF KENT, AND LEE E. CLOUGH, OF AKRON, OHIO, ASSIGNORS TO THE MASON TIRE AND RUBBER COMPANY, A CORPORATION OF OHIO.

STITCHER WHEEL AND GUARD.

Application filed October 15, 1920. Serial No. 417,219.

*To all whom it may concern:*

Be it known that we, JOHN W. DIRKSON, a citizen of the United States, residing at Kent, in the county of Portage and State of Ohio, and LEE E. CLOUGH, a citizen of the United States, residing at Akron, in the county of Summit and State of Ohio, have invented certain new and useful Improvements in Stitcher Wheels and Guards, of which the following is a specification.

Our invention relates to improvements in stitcher wheel and guard and has for its object the provision of mechanism for more expeditiously stitching the fabric for automobile tires upon the carcass.

More specifically, our invention pertains to the association with any suitable stitcher wheel or mechanism, of a guard device that is positioned so as to receive the fabric, smooth it in relation to the stitcher wheel, and prevent said fabric from coming into contact with the wheel except along its contacting edge.

The improvements of our invention are shown in their essential features in the accompanying drawings in connection with the stitcher wheel arms which may be actuated in any suitable manner; these are illustrated in association with the ring or mandrel whereon the carcass is built.

A modification of our improvement is also illustrated as adapted for lighter work, but it should be understood that the details herein shown and described are not essential to the practice of our invention, except as they may be specified in the appended claims defining the same.

Referring to the drawings,—

Figure 1:
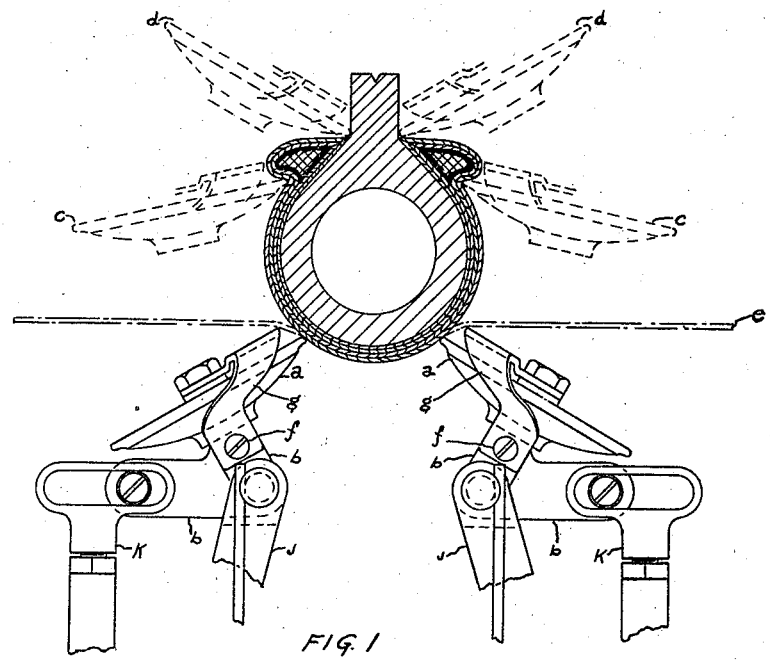
Figure 1 illustrates a mandrel and carcass thereon in sectional view with two positions of the stitcher wheels indicated by dotted lines, together with the two stitcher wheels and fragmentary portions of the stitcher arms sufficient for explaining the purpose of our invention.
Figure 2:
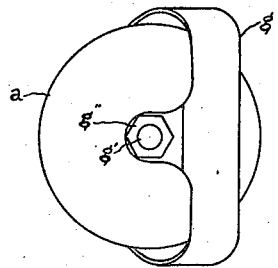
Fig. 2 is a face view of the stitcher wheel and guard.

Referring, first, to Fig. 2, it will be seen that the stitcher wheel ($a$) is of approved or well known type, being rotatably mounted upon the pivoted stitcher arm ($b$). The means for actuating the stitcher wheel and arm need not be detailed, further than to explain that said stitcher wheel is adapted to be advanced successively from the position shown on either side of Fig. 1, along the sidewall of the carcass adjacent to the bead as indicated by the dotted line position ($c$); thence about the bead and along its base to the dotted line position ($d$), all as will be well understood by those skilled in the art.

In the manufacture of automobile tires the rapid rotation of the mandrel in forming the carcass causes the fabric ($e$) to fly out under the influence of centrifugal force, as also indicated by dotted lines in Fig. 1, and suitable provision, preferably, is made for pre-shaping the fabric as it is stitched into place upon the carcass.

The means that we employ and show in the accompanying drawings comprise a simple form of guard ($g$), which is positioned closely adjacent to the advancing operative edge of the stitcher wheel ($a$) as best shown in Fig. 1—the said guard being secured to the stub of the pivoted stitcher arm by an extension ($g'$) and nut ($g''$). The ends of the guard, in order to afford sufficient rigidity, are secured above and below the stitcher arm as by screws ($f$); the relation of the edge of the guard being such that its edge will be invariably presented to the fabric in advance of the operative edge of the stitcher wheel, as will be appreciated by referring to the full line and the dotted line positions of Fig. 1.

Figure 3:
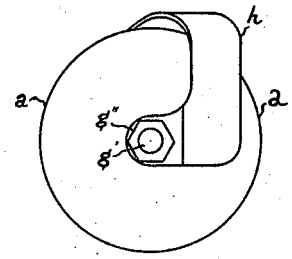
Fig. 3 is a similar view of a modified form of our improved device. Throughout each of the several figures of the drawings we have employed the same character of reference to indicate similar parts.

In Fig. 3 the lighter guard member ($h$) is associated with the stitcher wheel ($a$) that approximates only half the fully shaped guard of Fig. 2. For many purposes this modification is found ample for pre-shaping and smoothing the fabric, although obviously it is not as rigid as the guard shown upon the left.

Referring again to Fig. 1, it will be seen that three typical positions of the right and left-hand stitching mechanism are shown ranging from the position assumed at the commencement of the stitching operation to those positions into which the stitching wheels and guard are actuated at the completion of the stitching operation.

This figure will graphically demonstrate the fact that while the guard is at all times relatively in advance of its associated stitching wheel, it does not in the least interfere with the actual stitching operation, but instead, said guard effectively cooperates with the stitching wheel and secures a much smoother and more rapid application of the fabric, than is ordinarily obtainable.

The pivoted stitcher arms are adapted to be actuated respectively by their connecting levers ($k$), but the actuating mechanism forms no part of the present invention and need not be further explained or shown.

Having now described our improvements, as preferably embodied in a simple form of stitching wheel and guard, we claim as new, and desire to secure by Letters Patent, together with such modifications as may be made merely by skill in the art, the following:—

1. The combination with a rotatably mounted stitcher wheel, of a U-shaped guard member stationarily mounted with respect to said stitcher wheel and spaced apart from its operative edge; said guard member being rigidly attached upon both sides of the stitcher wheel, substantially as set forth.

2. The combination with a rotatably mounted stitcher wheel, of a U-shaped guard member stationarily mounted with respect to said stitcher wheel, and positioned in advance of its operative edge for pre-engagement with the fabric acted upon; said guard member being rigidly attached upon both sides of the stitcher wheel, substantially as set forth.

3. The combination with a rotatably mounted stitcher wheel, of a member positioned as a completely enclosing chordlike guard about a portion of said stitcher wheel with its edge in advance of the operative edge of the stitcher wheel and adapted to be advanced in unison with said wheel, substantially as set forth.

4. The combination with a pivoted stationary arm, of a stitcher wheel rotatably mounted thereon, and a guard member secured rearwardly and forwardly about a portion of said stitcher wheel with its edge adjacent to, but in advance of the operative edge of the stitcher wheel, whereby the fabric is pre-shaped for the action of the stitcher wheel thereon, substantially as set forth.

5. The combination with a pivoted stitcher arm, of a rotatably mounted stitcher wheel thereon, a guard member terminally connected at the rear of said stitcher wheel and having its forward edge adjacent to, but in advance of the operative edge of the stitcher wheel, and means for intermediately connecting the guard in front of the stitcher wheel, substantially as set forth.

In testimony whereof we do now affix our signatures.

JOHN W. DIRKSON
LEE E. CLOUGH.